(12) United States Patent
Nakamura

(10) Patent No.: US 12,732,060 B2
(45) Date of Patent: Sep. 8, 2026

(54) DRIVE DEVICE WITH ELECTRIC MOTOR AND COVER FOR CONTROLLER

(71) Applicant: DENSO CORPORATION, Kariya-city (JP)

(72) Inventor: Ryosuke Nakamura, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 296 days.

(21) Appl. No.: 18/396,141

(22) Filed: Dec. 26, 2023

(65) Prior Publication Data

US 2024/0162779 A1 May 16, 2024

Related U.S. Application Data

(63) Continuation of application No. PCT/JP2022/024050, filed on Jun. 16, 2022.

(30) Foreign Application Priority Data

Jun. 28, 2021 (JP) ................................ 2021-106773

(51) Int. Cl.
*H02K 5/22* (2006.01)
*H02K 5/02* (2006.01)

(52) U.S. Cl.
CPC ............... *H02K 5/225* (2013.01); *H02K 5/02* (2013.01); *H02K 2211/03* (2013.01)

(58) Field of Classification Search
CPC .... H02K 2211/03; H02K 11/30; H02K 11/33; H02K 11/35; H02K 11/38; H02K 5/225; H02K 5/22; H02K 5/04
See application file for complete search history.

(56) References Cited

U.S. PATENT DOCUMENTS 6,354,674 B1 * 3/2002 Iwamoto ............. F15B 13/0832 303/119.3
8,471,418 B2 * 6/2013 Yamasaki .............. H02K 11/33 310/71
9,124,155 B2 * 9/2015 Yamasaki .............. H02K 5/225
2012/0161590 A1 6/2012 Yamasaki et al.
(Continued)

FOREIGN PATENT DOCUMENTS

JP S56-66157 U 6/1981
JP S59-32335 A 2/1984
JP 2017-78463 A 4/2017

*Primary Examiner* — Oluseye Iwarere
*Assistant Examiner* — Nicholas Lee Setzer
(74) *Attorney, Agent, or Firm* — Precision Patents, P.C.

(57) ABSTRACT

A drive device is integrally configured with a motor and a controller circuit. A metal rear frame is provided on an end of the motor in the axial direction at a side where the controller circuit is provided. Electronic components constituting the controller circuit are mounted on a circuit board. A cover, which is a bottomed cylindrical shape, has a plurality of flexible locking portions capable of being engaged with a plurality of fixed locking portions provided on a side surface of the rear frame by a snap-fit manner. The cover is fixed to the rear frame so as to cover the circuit board. The cover has a pseudo-circular-cylindrical portion and flat surface portions. Flexible locking portions are provided on a flat surface portion of the pseudo-circular-cylindrical portion.

3 Claims, 7 Drawing Sheets

(56) References Cited

U.S. PATENT DOCUMENTS

| | | | | |
|---|---|---|---|---|
| 2014/0292128 | A1* | 10/2014 | Yokoe | H02K 3/525<br>310/89 |
| 2015/0115754 | A1* | 4/2015 | Yamasaki | H02K 5/04<br>310/71 |
| 2016/0165736 | A1* | 6/2016 | Tsuboi | H02K 11/33<br>174/50.54 |
| 2016/0352189 | A1* | 12/2016 | Yamada | H02K 5/225 |
| 2018/0241261 | A1* | 8/2018 | Yamashita | H02K 1/16 |
| 2019/0372420 | A1* | 12/2019 | Ogawa | H02K 5/10 |
| 2020/0366151 | A1* | 11/2020 | Nakamura | F16J 15/061 |
| 2021/0261187 | A1* | 8/2021 | Ishii | H02K 5/225 |
| 2024/0048016 | A1* | 2/2024 | Nakamura | H02K 11/33 |

* cited by examiner 100
60
62
O
II
II
63
64
631
643
65
680
632
670
631
66
68
67
20
44
40
52
43
50
30
36
38
37
19
10
O 100
62
60
40
34
20
52
632
30
50
32
18
37
36
67
14
12
11
15
10
13
17
16
O

DRIVE DEVICE WITH ELECTRIC MOTOR AND COVER FOR CONTROLLER

CROSS REFERENCE TO RELATED APPLICATIONS

The present application is a continuation application of International Patent Application No. PCT/JP2022/024050 filed on Jun. 16, 2022, which designated the U.S. and is based on and claims the benefit of priority from Japanese Patent Application No. 2021-106773 filed on Jun. 28, 2021. The entire disclosures of all of the above applications are incorporated herein by reference.

TECHNICAL FIELD

The present disclosure relates to a drive device.

BACKGROUND

Conventionally, a drive device is used as a kinetic power source to move, i.e., to rotate a device. The drive device has a motor and a controller circuit which drives and controls the motor. The motor and the control circuit are integrally configured as a single component. A cover, which covers a circuit board of the controller circuit on the motor, is used and assembled by bolting, crimping, or the like. The drive device is required to provide a certain level of mechanical strength and to make it easy to assemble. In the above aspects, or in other aspects not mentioned, there is a need for further improvements in a drive device.

SUMMARY

A drive device according to the present disclosure is configured integrally with a motor including a stator and a rotor, and a controller circuit that drives and controls the motor. This drive device includes a metal rear frame, a circuit board, and a bottomed cylindrical cover.

The rear frame is provided at an end of the motor on a side of the controller circuit in an axial direction of the motor. The circuit board is provided on an opposite side of the motor with respect to the rear frame, and has electronic components constituting the controller circuit mounted thereon.

The cover has a plurality of flexible locking portions that can be engaged with a plurality of fixed locking portions provided on a side surface of the rear frame in a snap-fit manner, and is fixed to the rear frame and covers the circuit board.

The cover has a pseudo-circular-cylindrical portion in which at least a portion of an axially projected shape is a circular arc or a curve similar to a circular arc. A flat surface portion is formed on a part of a side surface of the pseudo-circular-cylindrical portion. At least one of the flexible locking portions is provided on a flat surface portion of the pseudo-circular-cylindrical portion.

In the drive device of the present disclosure, the cover and the motor can be assembled using a snap-fit method in the pseudo-circular-cylindrical portion of the cover. Further, if a model change is performed from a drive device with an assembly type different from a snap fit type to the drive device of the present disclosure, it is possible to minimize change in the silhouette of the cover and the circuit board.

BRIEF DESCRIPTION OF DRAWINGS

The above and other objectives, features and advantages of the present disclosure will become more apparent from the following detailed description with reference to the accompanying drawings.

The disclosure is further described with reference to the accompanying drawings in which.

DETAILED DESCRIPTION

Conventionally, in a drive device in which a motor and a controller circuit that drives and controls the motor are integrally configured, a technique is known in which a cover that covers a circuit board of the controller circuit and the motor are assembled by bolting, crimping, or the like. Further, JP2012-152091A discloses a configuration in which an end cover and a connector holder, and the connector holder and a holder are fixed by snap fitting.

Since the motor has a cylindrical shape, the cover is basically designed to have a cylindrical shape in order to use space effectively. However, there is a problem in that it is difficult to form and provide snap-fit structures on a cylindrical curved surface. Hereinafter, in this specification, the term "pseudo-circular-cylindrical portion" is used to refer to a shape that is not a strict cylinder but includes an elliptical cylinder and the like similar to a cylinder. Particularly, a pseudo-circular-cylindrical portion includes a member 63 described and illustrated in embodiments of this disclosure.

It is an object of the present disclosure to provide a drive device in which a cover and a motor can be assembled using a snap-fit method in a pseudo-circular-cylindrical portion of the cover.

Embodiment

A driving device according to an embodiment is described based on the drawings. The drive device of this embodiment is applied to an electric power steering device for a vehicle, and includes a motor that outputs a steering assist torque and a controller circuit that drives and controls the motor. In other words, the drive device of this embodiment is a so-called "mechanical and electrical integrally configured type" motor. The mechanical and electrical integrally configured type motor is disclosed in JP2012-152091A, US2012/0161590A1 and the like.

Figure 1:
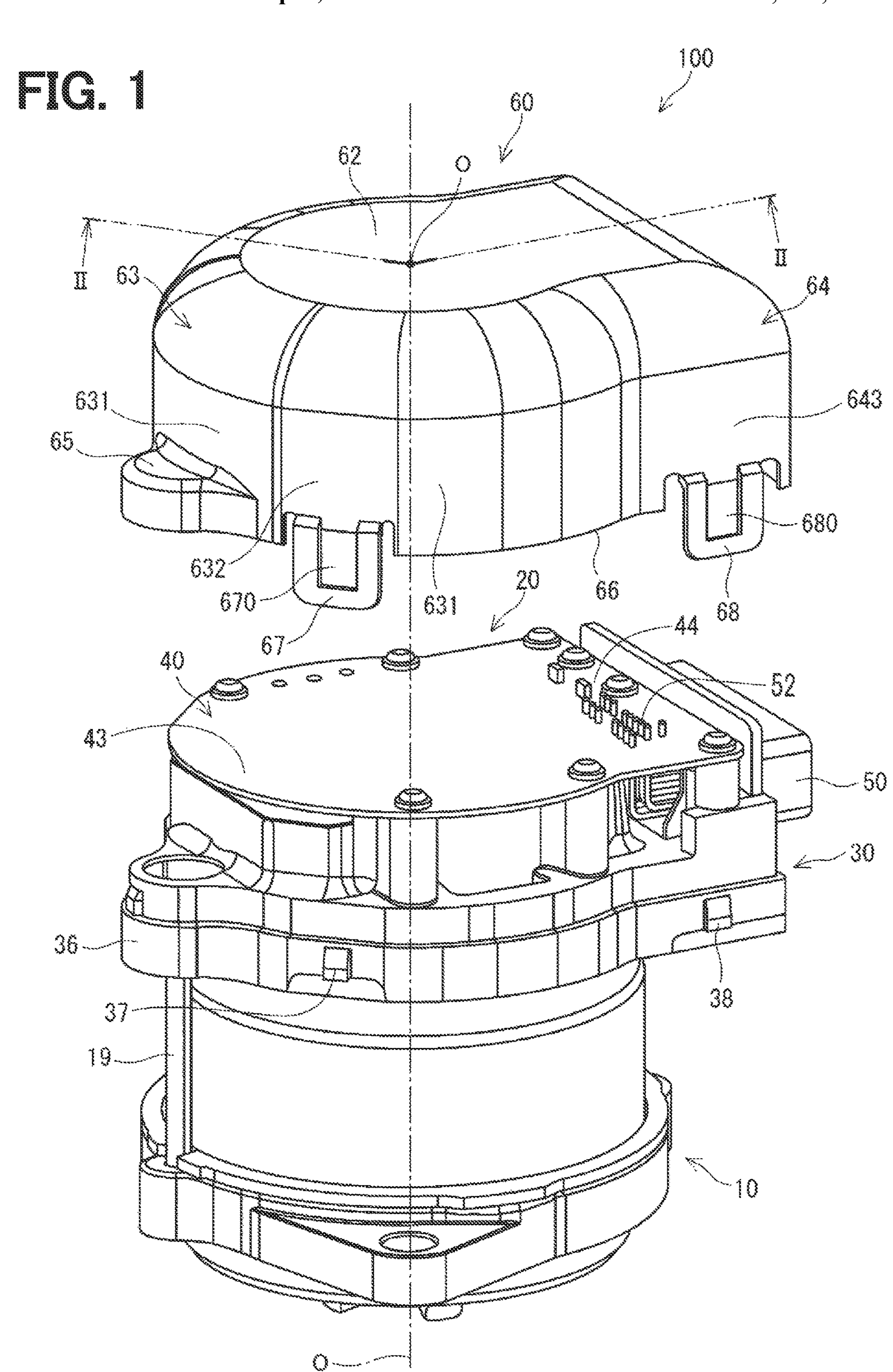
FIG. 1 is a perspective view of a drive device according to an embodiment before a cover is assembled and components mounted on a circuit board are omitted.
Figure 2:
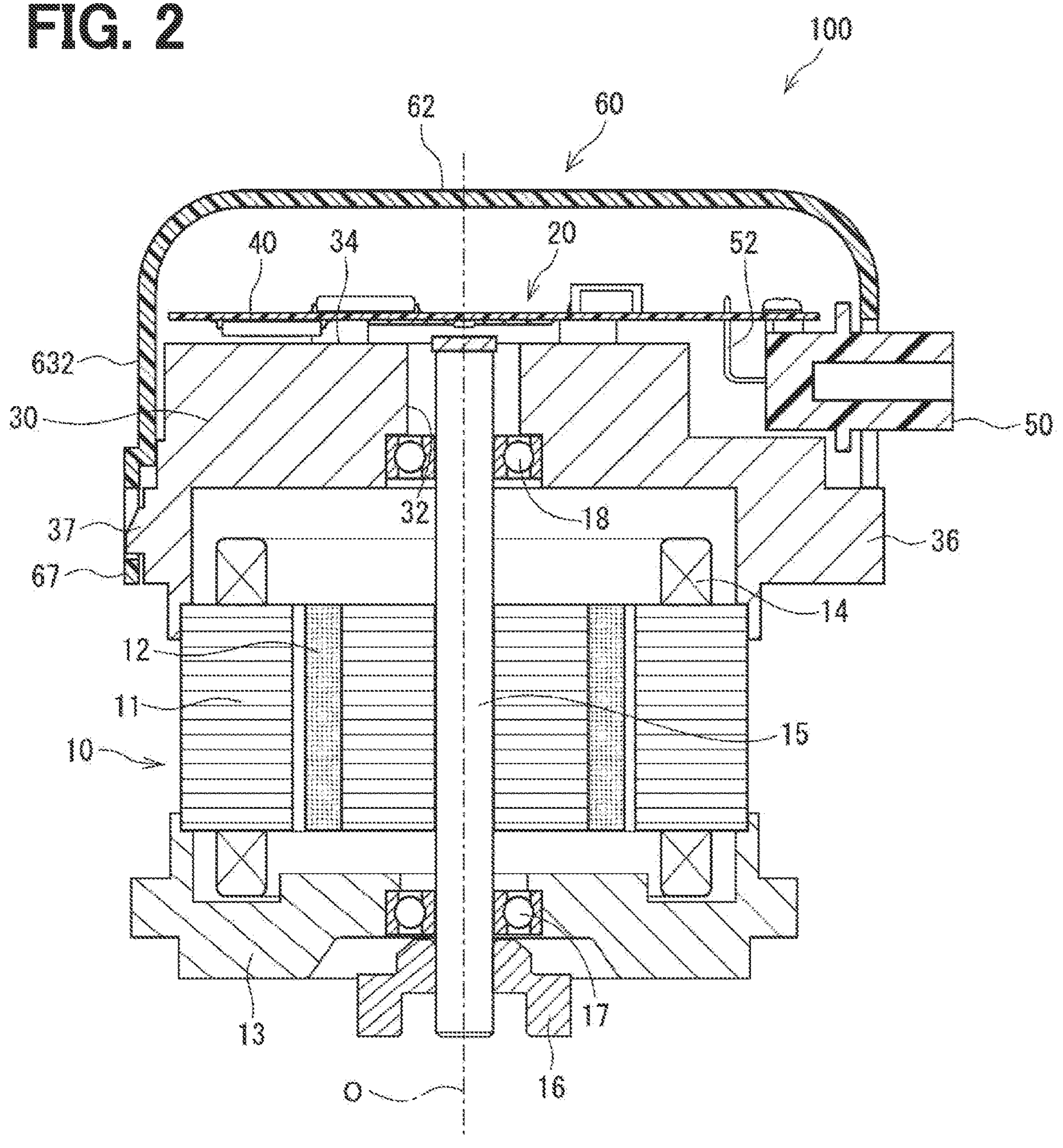
FIG. 2 is an axial cross-sectional view taken along line II-O-II in FIG. 1 after the cover is assembled.
Figure 3:
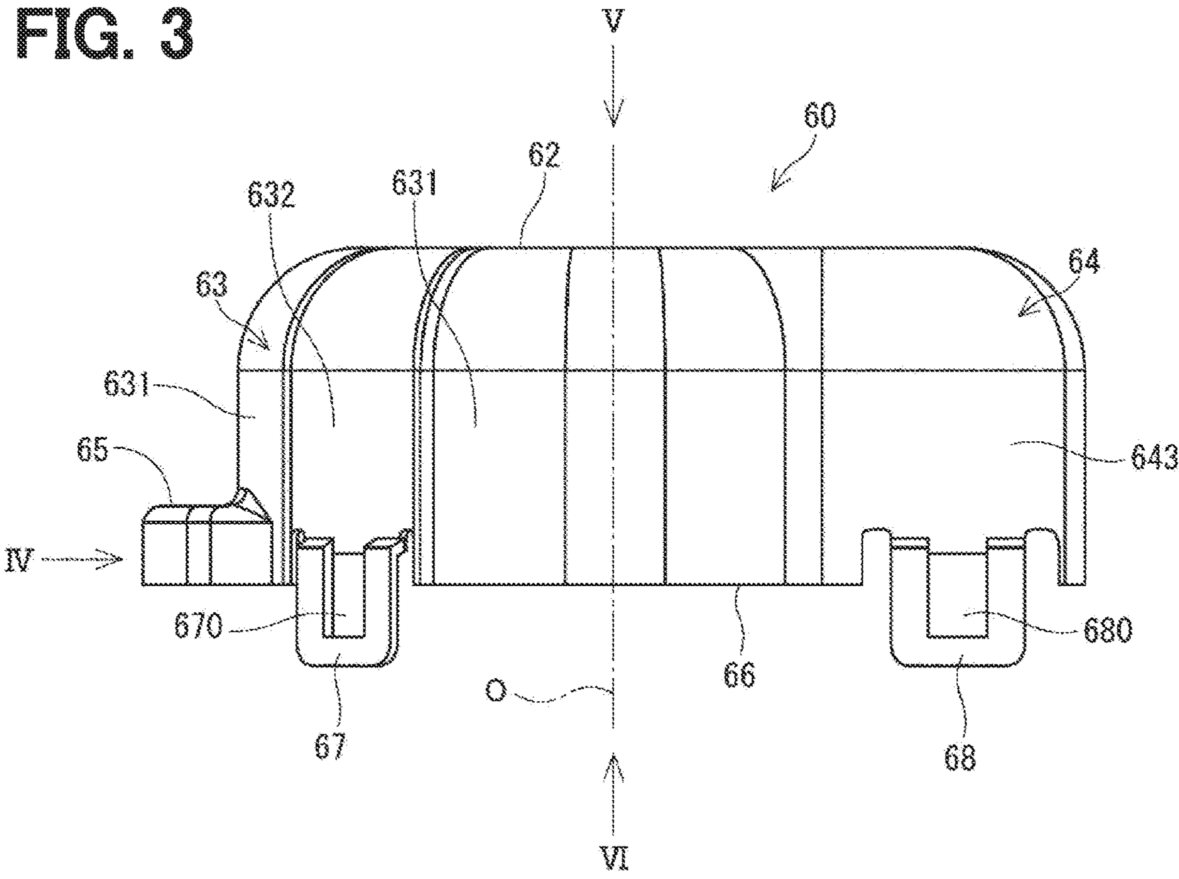
FIG. 3 is a front view of the cover of the drive device in FIG. 1.
Figure 4:
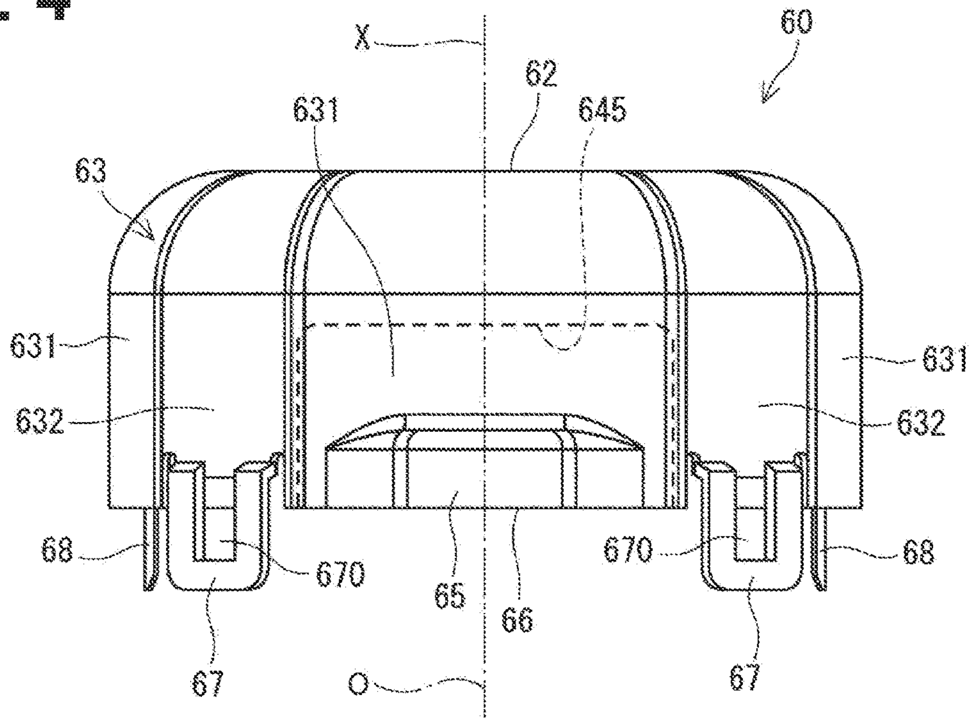
FIG. 4 is a left side view of the cover of the drive device in FIG. 1, i.e., a view in an arrow IV of FIG. 3.

A rotation axis of the motor 10 is indicated as "O" common to each of the following drawings. A direction of the rotation axis "O" of the motor is simply referred to as an axial direction. First, the overall configuration of the drive device 100 is described with reference to FIGS. 1 and 2. FIG. 1 shows a perspective view before a cover 60 is assembled. Electronic components mounted on the circuit board 40 are omitted in the Illustrations. FIG. 2 shows an axial cross-sectional view after the cover 60 is assembled. A side of an output shaft of the motor 10 shown in the bottom side of FIG. 2 is referred to as a front side, and a side of the cover 60 shown in the upper side of FIG. 2 is referred to as a rear side. The controller circuit 20 is arranged coaxially with the rotation axis "O" on a rear side of the motor 10.

The drive device 100 includes the motor 10 that is a three-phase brushless motor, and the controller circuit 20 that drives and controls the motor 10. The motor 10 includes a stator 11, a rotor 12, a front frame 13, a coil 14, a shaft 15, a joint 16, bearings 17 and 18, a rear frame 30, and the like.

A three-phase coil 14 is wound around the stator 11. The coil 14 is connected to the circuit board 40 via a motor terminal (not shown). A rotating magnetic field is formed in the stator 11 by controlling the energization of the coil 14 by the controller circuit 20. The rotor 12 is provided inside the stator 11, and has a shaft 15 fixed at its center. The shaft 15 is supported by the front bearing 17 held by the front frame 13 and the rear bearing 18 held by the rear frame 30 in a rotatable manner.

A plurality of permanent magnets are provided on an outer periphery of the rotor 12. The rotor 12 rotates about the shaft 15 due to the rotating magnetic field formed in the stator 11 by energizing the coil 14. The joint 16 that transmits rotation is provided at the front end of the shaft 15.

The rear frame 30 is made of metal such as aluminum alloy, and is provided at the end of the motor 10 on a side of the controller circuit 20 in the axial direction. A shaft hole 32 through which the shaft 15 is inserted is formed in a center of the rear frame 30. A rear bearing 18 is held on a front side of the rear frame 30, and the circuit board 40 is fixed to an end surface 34 on the rear side. The rear frame 30 supports the circuit board 40 and the rear bearing 18, and also functions as a heat sink that receives heat radiation from electronic components mounted on the circuit board 40.

A frame end portion 36 having a slightly larger radial dimension is provided at an end of the rear frame 30 on a side of the motor 10. The frame end portion 36 of the rear frame 30 and the front frame 13 are fastened together with through-hole bolts 19. A plurality of fixed locking portions 37 and 38, which are in protruding shapes, are provided on the side surface of the frame end portion 36.

Specifically, the fixed locking portion 37 is provided at a position corresponding to the flexible locking portion 67 formed on the pseudo-circular-cylindrical portion 63 of the cover 60, which is described later. The fixed locking portion 38 is provided at a position corresponding to the flexible locking portion 68 formed on the rectangular cylinder portion 64 of the cover 60. Therefore, a total of four fixed locking portions 37 and 38 are provided on the side surface of the frame end portion 36 of the rear frame 30. In FIG. 1, two fixed locking portions 37 and 38 are illustrated, and remaining two fixed locking portions 37 and 38 are located on a back side of the drawing.

Since the rear frame 30 is made of metal, it is obvious that the fixed locking portions 37 and 38 do not deform. Therefore, the portions are referred to as fixed locking portions in comparison with the flexible locking portions 67 and 68 made of resin. As described later, in this embodiment, the flexible locking portions 67 and 68 and the fixed locking portions 37 and 38 provide engagement configurations which are able to be engaged and disengaged in a snap-fit manner. The fixed locking portions 37 and 38 are preferably formed so that protruding portions have slant surfaces inclined outward from the rear side toward the front side as shown in FIG. 2. As a result, the fixed locking portions 37 and 38 works as guides when engaging the flexible locking portions 67 and 68 onto the fixed locking portions 37 and 38.

The circuit board 40 is fixed to the end surface 34 on the rear side of the rear frame 30. That is, the circuit board 40 is provided on an opposite side of the motor 10 with respect to the rear frame 30, that is, on the rear side. On the circuit board 40, electronic components constituting the controller circuit 20 are mounted. Specifically, electronic components includes, which are mounted on the circuit board 40, a plurality of switching elements constituting an inverter, at least one coil and at least one capacitor constituting a noise filter, at least one microcomputer or at least one IC constituting a control unit, at least one current sensor, and at least one rotation angle sensor, etc.

The drive device 100 of this embodiment has a "lateral connector type" configuration in which the connector 50 protrudes in a direction orthogonal to the rotation axis "O" of the motor. As is described later with reference to FIG. 7, the connector 50 is connected to a rectangular plate portion 44 of the circuit board 40 via a plurality of terminals 52. Power cables that supply power to the controller circuit 20 and signal cables that communicate signals between the controller circuit 20 and a control circuit of the vehicle are connected to the connector 50.

The cover 60 has a cylindrical shape with a bottom, and is fixed to the rear frame 30 from the rear side of the circuit board 40 to cover the circuit board 40. In this embodiment, the cover 60 is integrally formed of resin and is fixed to the rear frame 30 using a snap fit method. Hereinafter, the configuration of the cover 60 of this embodiment is explained in detail.

Next, a structure of the cover 60 is described in detail with reference to FIGS. 1 to 6 and FIG. 8A. The cover 60 includes a pseudo-circular-cylindrical portion 63 and a rectangular cylindrical portion 64 that extend from the top surface portion 62 to the side surfaces. The pseudo-circular-cylindrical portion 63 and the rectangular cylindrical portion 64 are provided symmetrically with respect to a reference flat surface "X" that includes the rotation axis "O" of the motor.

Figure 5:
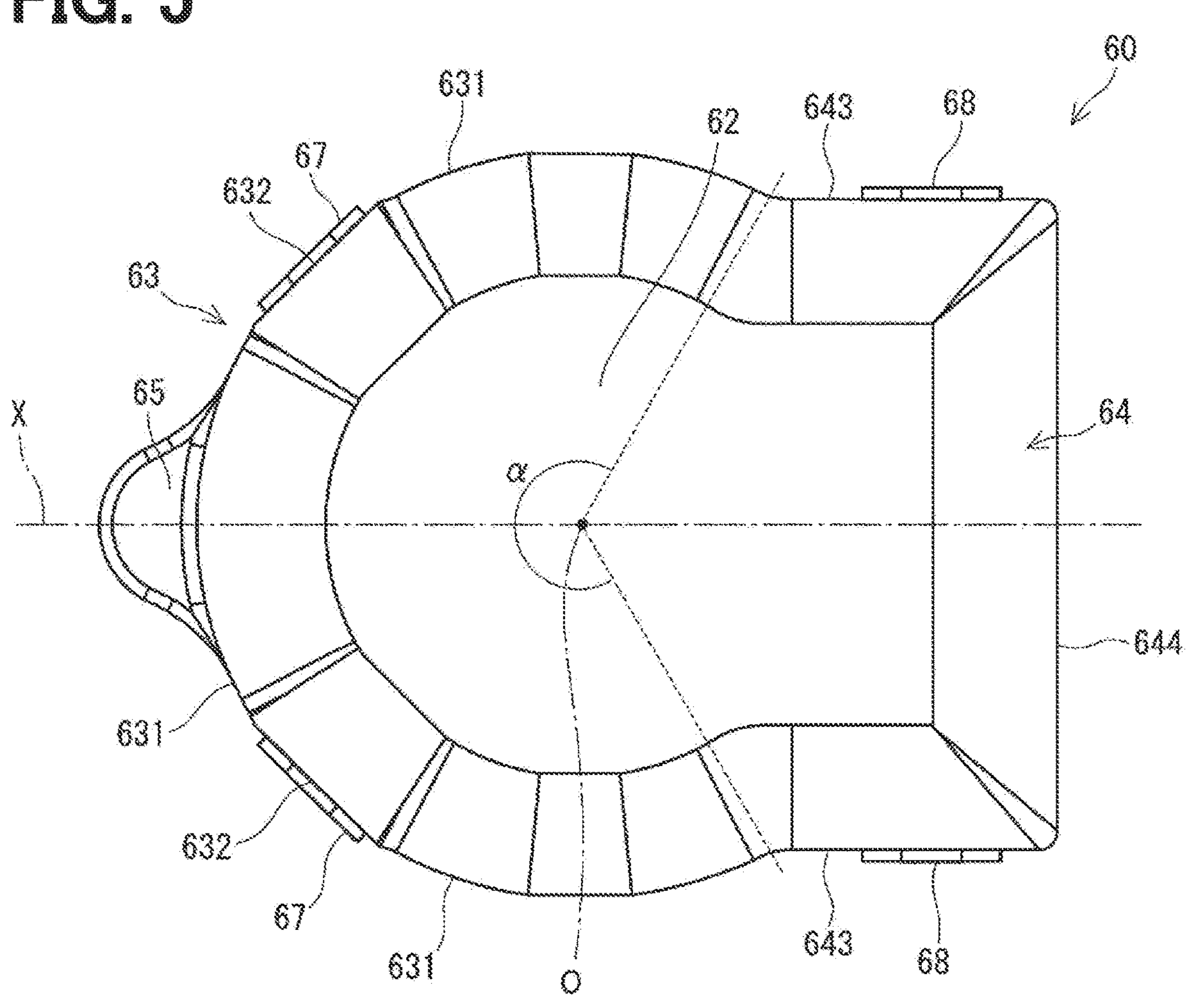
FIG. 5 is a plan view of the cover of the drive device in FIG. 1, i.e., a view in an arrow V of FIG. 3.
Figure 6:
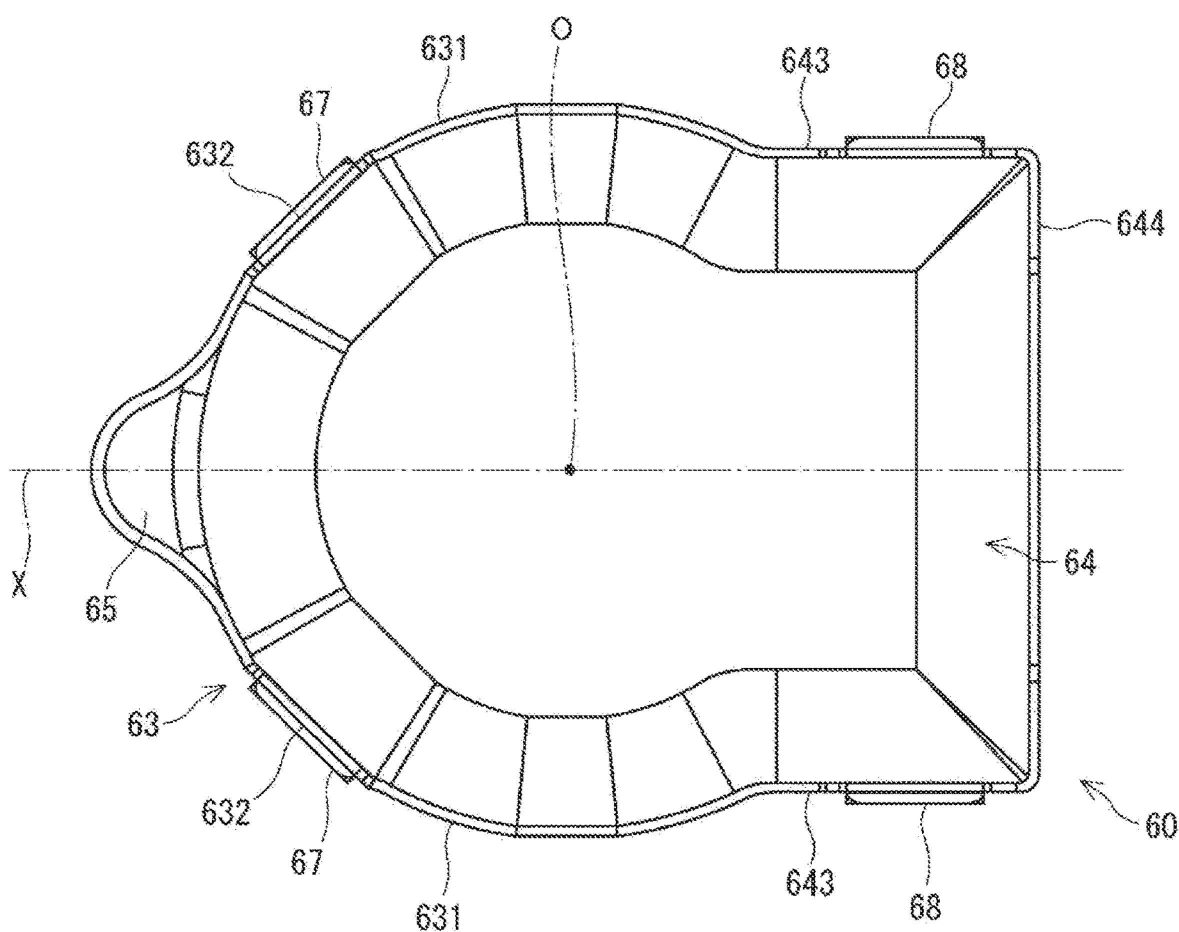
FIG. 6 is a left side view of the cover of the drive device in FIG. 1, i.e., a view in an arrow VI of FIG. 3.

To put it simply, in FIGS. 5 and 6, which are axial projection views, the cover 60 is formed in a shape in which a circle and a rectangle are connected symmetrically with respect to a reference line "X" passing through a center of the circle. A length of a side of the rectangle orthogonal to the reference line "X" is less than or equal to a diameter of the circle. Therefore, the central angle of the circular arc is 180° or more. In this embodiment, a central angle $\alpha$ of a circular arc of the pseudo-circular-cylindrical portion 63 is approximately 240 degrees.

Specifically, the pseudo-circular-cylindrical portion 63 is defined as "a portion in which at least a portion of a projected shape in the axial direction is constituted by a circular arc or a curved line similar to a circular arc." In the pseudo-circular-cylindrical portion 63 of this embodiment, a part of the projected shape in the axial direction is constituted by a circular arc. Since the cover 60 covers the motor 10, it basically has a circular cylindrical shape that follows the silhouette of the motor 10.

A flat surface portion 632 whose projected shape in the axial direction is represented by a straight line is formed on a part of the side surface of the pseudo-circular-cylindrical portion 63. The portions other than the flat surface portion 632 form a curved surface portion 631 whose projected shape in the axial direction is represented by a circular arc. In this embodiment, two of the flat surface portions 632 are formed, one by one, on both sides with respect to the reference flat surface "X". The flat surface portion 632 is formed to occupy an angular range from about 30 degrees to about 60 degrees about the rotation axis "O" of the motor with respect to the reference flat surface "X".

Figure 8A:
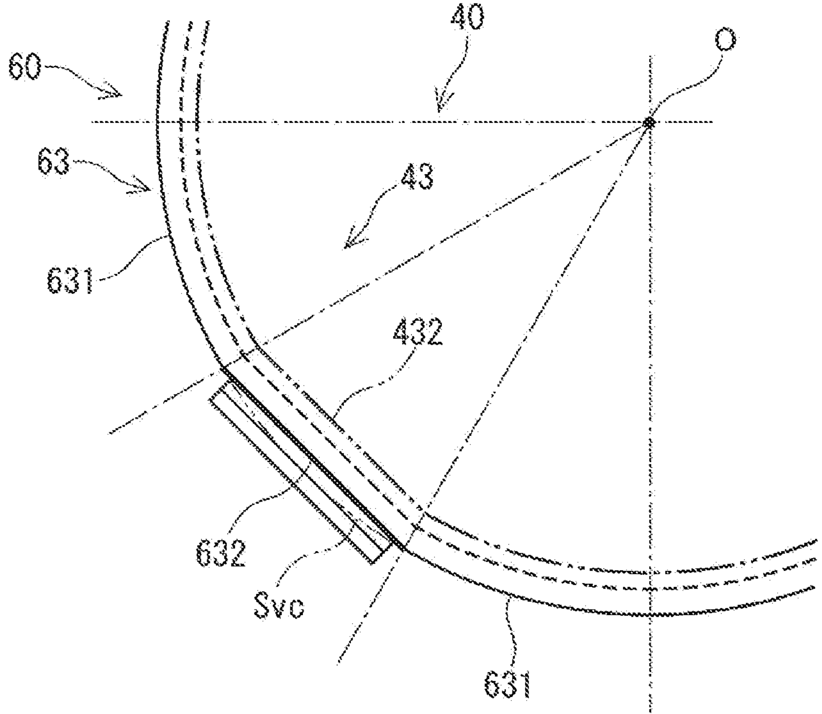
FIG. 8A is a diagram showing a position of a flat surface portion of a pseudo-circular-cylindrical portion in the cover of the drive device according to the embodiment.

Further, as shown in FIG. 8A, the flat surface portion 632 of the pseudo-circular-cylindrical portion 63 is formed on an inside of a virtual curved surface Svc formed by extending the curved surface portion 631 adjacent on both sides. Specifically, a straight line connecting end points of the curved surface portions 631 adjacent on both sides, i.e., a straight line corresponding to a chord of a circle, constitutes the flat surface portion 632. Since the thickness of the cover 60, which is a resin molded product, is substantially constant, the inner wall of the flat surface portion 632 is located inside a virtual inner wall curved surface that is an extension of the inner wall of the curved surface portion 631.

The rectangular cylindrical portion 64 includes three flat surfaces on its side surfaces: two of the extension surface portions 643; and one of the opening surface portion 644. The two extension surface portions 643 are flat surfaces that are parallel to each other and connected to the side surfaces of the pseudo-circular-cylindrical portion 63. The opening surface portion 644 is a flat surface orthogonal to two to the extension surface portions 643. As shown by the broken line in FIG. 4, a notch 645 through which the connector 50 is inserted is formed in the opening surface portion 644. In this way, the rectangular cylindrical portion 64 of the cover 60 has a function of covering the terminal portion of the circuit board 40 that is connected to the connector 50 and the base portion of the connector 50.

The flexible locking portion 67 is formed on each flat surface portion 632 of the pseudo-circular-cylindrical portion 63, and the flexible locking portion 68 is formed on each extension surface portions 643 of the rectangular cylindrical portion 64. That is, the cover 60 of this embodiment has a total of four flexible locking portions 67 and 68. Four flexible locking portions 67 and 68 are arranged symmetrically with respect to the reference flat surface "X".

The flexible locking portions 67 and 68 extend in a direction opposite to the top surface portion 62, beyond the opening end 66, from a portion of the flat surface portion 632 or the extension surface portion 643 near the opening end 66. The flexible locking portions 67 and 68 have substantially U-shaped frame plate shapes, and locking holes 670 and 680 are formed inside the frames. The locking holes 670 and 680 are formed using a slide mold in a resin mold, for example.

The flexible locking portions 67 and 68 can be elastically deformed by the elasticity of the resin so that the distal ends thereof expand outward. If the cover 60 is placed directly above the rear frame 30, the flexible locking portions 67 and 68 overlap the fixed locking portions 37 and 38 before elastic deformation. As the distal ends of the flexible locking portions 67 and 68 expand outward, the frame portions ride over the protrusions, and the fixed locking portions 37 and 38 are accommodated inside the locking holes 670 and 680. In this way, the flexible locking portions 67 and 68 can be engaged with the fixed locking portions 37 and 38 of the rear frame 30 in a snap-fit manner.

In addition, a bolt shielding portion 65 is provided on the pseudo-circular-cylindrical portion 63 on an opposite side with respect to the rectangular cylindrical portion 64, which protrudes along the opening end 66 with a low height range. The bolt shielding portion 65 and the rectangular cylindrical portion 64 are located on opposite sides with respect to the pseudo-circular-cylindrical portion 63. The rectangular cylindrical portion 64 has a height as same as the pseudo-circular-cylindrical portion 63. The bolt shielding portion 65 has a height much lower than the pseudo-circular-cylindrical portion 63. The bolt shielding portion 65 covers a head of the through-hole bolt 19.

Figure 7:
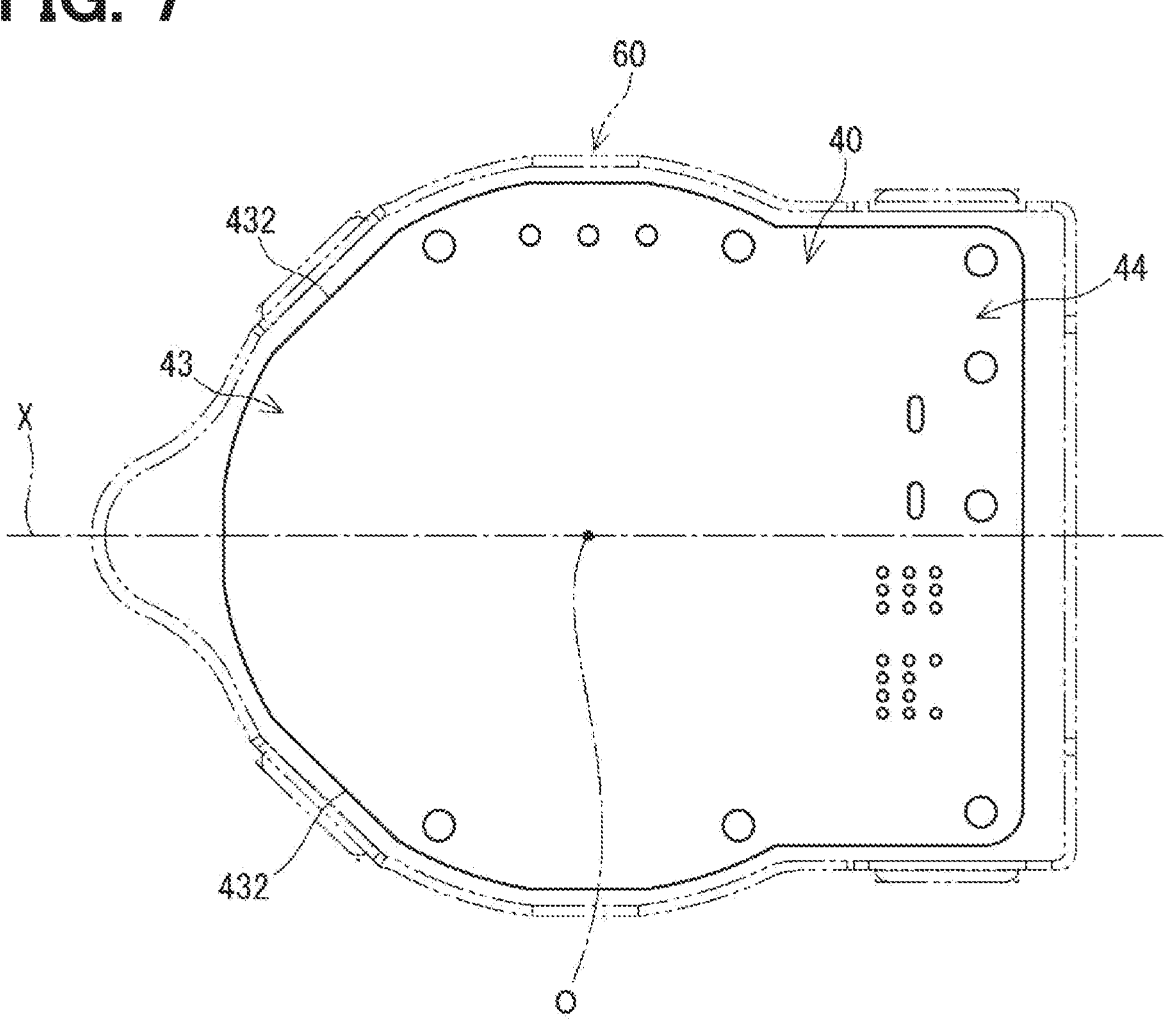
FIG. 7 is a plan view of a circuit board of the drive device in FIG. 1.

Next, a configuration of the circuit board 40 of the drive device 100 is described in detail with reference to FIGS. 1, 7, and 8A. As shown in FIG. 7, the circuit board 40 of this embodiment has an outer edge that follows an inner wall of the cover 60. That is, the circuit board 40 has a pseudo-circular-disk portion 43 corresponding to the pseudo-circular-cylindrical portion 63 of the cover 60 and a rectangular plate portion 44 corresponding to the rectangular cylindrical portion 64. The rectangular plate portion 44 is connected to the connector 50 via a plurality of terminals 52. Further, a corresponding flat surface portion 432, which has a shape defined by outer edges of straight lines, is formed on a side of the pseudo-circular-disk portion 43 of the substrate 40 at a position facing the inner wall of the flat surface portion 632 of the pseudo-circular-cylindrical portion 63.

As shown in FIG. 8A, in this embodiment, the flat surface portion 632 of the cover 60 is formed inside the virtual curved surface Svc. Therefore, if the pseudo-circular-disk portion 43 of the circuit board 40 is formed of a simple circular arc, the outer edge of the circuit board 40 may interfere with the inner wall of the cover 60 depending on a distance between the inner wall of the cover 60 and the circuit board 40. Therefore, in this embodiment, a corresponding flat surface portion 432 is formed on the circuit board 40 in correspondence with the flat surface portion 632 of the cover 60.

Effect of Embodiment (1) The cover 60 of this embodiment has the plurality of flexible locking portions 67 and 68 that can be engaged with the plurality of fixed locking portions 37 and 38 provided on the side surface of the rear frame 30 in a snap-fit manner. At least one of the flexible locking portions 67 is provided on the flat surface portion 632 formed on a part of the side surface of the pseudo-circular-cylindrical portion 63.

In the drive device 100 of the present disclosure, the cover 60 and the motor 10 can be assembled using a snap-fit method using the pseudo-circular-cylindrical portion 63 of the cover 60. Therefore, it is possible to reduce the number of parts and assembly man-hours compared to bolt fastening or caulking fastening.

In addition, if a model is changed from a drive device with a non-snap-fit assembly type to the drive device with this embodiment, there could be a needs of (1) no increase in size in view of a purpose of ensuring mount-ability in a vehicle and (2) no significant decrease in size in view of a purpose of securing a mounting area for a circuit board. In considering this need, in this embodiment, it is possible to minimize changes in the silhouettes of the cover 60 and the circuit board 40.

(2) The flat surface portion 632 of the pseudo-circular-cylindrical portion 63 is formed on an inside of the virtual curved surface Svc formed by extending the curved surface portions 631 adjacent on both sides of the flat surface portion 632. As a result, if a model is changed from a drive device with a non-snap-fit assembly type to the drive device with this embodiment, it is possible to avoid increasing in the silhouette.

(3) The circuit board 40 has an outer edge which is shaped along the inner wall of the cover 60. The circuit board 40 has a corresponding flat surface portion 432, in which the outer edge is formed with a straight line, on a position facing an inner wall of the flat surface portion 632 of the pseudo-circular-cylindrical portion 63. Thereby, interference between the cover 60 and the circuit board 40 can be avoided while ensuring the maximum area of the circuit board 40.

(4) In the drive device 100 of the "lateral connector type" in which the connector 50 protrudes from the side surface of the cover 60 in a direction orthogonal to the rotation axis "O" of the motor, the cover 60 includes the rectangular cylindrical portion 64 in addition to the pseudo-circular-cylindrical portion 63. The connector 50 is disposed in the rectangular cylindrical portion 64. In this arrangement, the cover 60 has the rectangular cylindrical portion 64 which includes sides including two extension surface portions 643 and one opening surface portion 644. The extension surface portions 643 are parallel to each other and are flat surfaces connected to side surfaces of the pseudo-circular-cylindrical portion 63. The opening surface portion 644 is a flat surface orthogonal to the extension surface portions 643. The flexible locking portion 68, which is different from the flexible locking portion 67 formed on the flat surface portion 632 of the pseudo-circular-cylindrical portion 63, is formed on the extension surface portion 643 of the rectangular cylindrical portion 64.

In other words, the flexible locking portions 67 and 68 are formed on the extension surface portions 643 of the rectangular cylindrical portion 64 in addition to the flat surface portions of the pseudo-circular-cylindrical portion 63. This realizes a configuration suitable for the "lateral connector type".

(5) As shown in FIGS. 5 and 6, the pseudo-circular-cylindrical portion 63 and the rectangular cylindrical portion 64 are provided symmetrically with respect to the reference flat surface "X", and the plurality of flexible locking portions 67 and 68 are arranged symmetrically with respect to the reference flat surface "X". The reference flat surface "X" includes the rotation axis "O" of the motor. This improves a balance of the fastening forces on both sides of the reference flat surface "X".

(6) The cover 60 is integrally formed of resin. Thereby, the drive device 100 can be made lighter and the number of parts can be reduced.

OTHER EMBODIMENTS (a) The "pseudo-circular-cylindrical portion" of the cover 60 includes not only a portion in which at least a part of projected shape in the axial direction is formed with has made up of a circular arc, and but also a portion in which at least a part of projected shape in the axial direction is formed with "a curved line similar to a circular arc". The term "a curved line similar to a circular arc" typically means a curve that is convex outward from a center, such as an ellipse. In other words, "the pseudo-circular-cylindrical portion" is defined as a concept expanded from "a circular-cylindrical portion" which is a narrow sense, and is defined to include a shape such as an elliptical cylindrical portion which is capable of forming a flat surface portion similar to a circular-cylindrical portion.

(b) The flexible locking portion and the fixed locking portion constitutes the snap-fit method coupler which may have a convex on one side and a concave on the other side. That is, the above embodiment may be configured in a reversal arrangement. For example, the flexible locking portions 67 and 68 of the cover 60 may be provided by convex shapes, and the fixed locking portions 37 and 38 of the rear frame 30 may be provided by concave shapes.

Figure 8B:
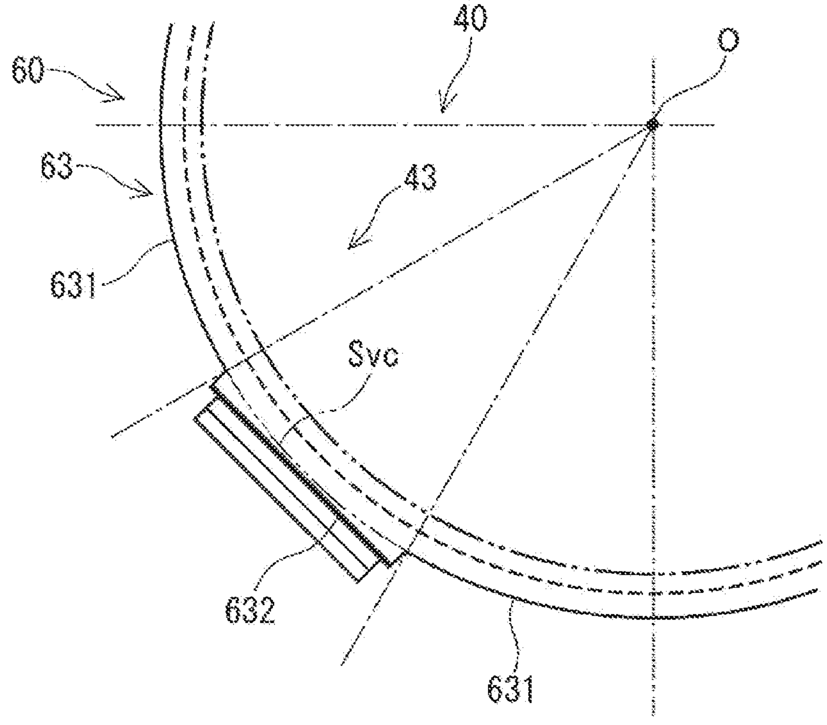
FIG. 8B is a diagram showing a position of a flat surface portion of a pseudo-circular-cylindrical portion in the cover of the drive device according to another embodiment.

(c) In contrast to the embodiment shown in FIG. 8A, the flat surface portion 632 of the cover 60 may be formed outside the virtual curved surface Svc, as shown in FIG. 8B. This configuration prevents the inner wall of the cover 60 from interfering with the circuit board 40. Further, if a die mold for a cover that does not have a flat surface portion is modified, a cavity mold can be modified in a cutting manner.

(d) Even in a configuration in which the flat surface portion 632 of the cover 60 is formed inside the virtual curved surface Svc, if the circuit board 40 has a circular shape that is one size smaller than the inner wall of the cover 60 and does not interfere with the flat surface portion 632, the circuit board 40 may not be formed with the corresponding flat surface portions 432.

(e) For example, if the drive device 100 is "an upper connector type" in which the connector protrudes in the axial direction from the top surface portion 62, the cover 60 may be composed only of the pseudo-circular-cylindrical portion 63 which does not include the rectangular cylinder portion 64. In that case, all the flexible locking portions 67 are provided on the flay plane portion 632 of the pseudo-circular-cylindrical portion 63. For example, the plurality of flexible locking portions 67 are arranged point-symmetrically with respect to the rotation axis "O" of the motor, thereby improving a balance of fastening force in the circumferential direction.

(f) The number and arrangement of the plurality of flexible locking portions 67 and 68 in the cover 60 are not limited to those in the above embodiment. Moreover, the arrangement of the plurality of flexible locking portions 67 and 68 is not symmetrical with respect to the reference flat surface "X", as shown in FIGS. 5 and 6, but may be arranged asymmetrically with respect to the reference flat surface "X".

(g) The cover 60 is not limited to being integrally formed of resin. That is, the cover may be formed with a cover body made of metal and the flexible locking portions 67 and 68 made of resin or rubber attached to the cover body. In this case, the cover body and the flexible locking portions 67 and 68 are formed separately and joined to provide a cover.

(h) The drive device of the present disclosure may be applied to various devices including in-vehicle devices other than electric power steering devices and devices other than devices to be mounted on vehicles.

The present disclosure should not be limited to the embodiment described above. Various other embodiments may be implemented without departing from the scope of the present disclosure.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A drive device, comprising:

a motor including a stator and a rotor and a controller circuit that drives and controls the motor, the motor and the controller circuit being integrally configured, the drive device comprising:

a rear frame made of metal and provided on an end in an axial direction of the motor on a side of the controller circuit;

a circuit board provided on an opposite side of the motor with respect to the rear frame, and on which electronic components constituting the controller circuit are mounted; and a cover which has a bottomed cylindrical shape, has a plurality of flexible locking portions capable of being engaged with a plurality of fixed locking portions provided on a side surface of the rear frame by a snap-fit manner, and is fixed to the rear frame so as to cover the circuit board, wherein the cover has a pseudo-circular-cylindrical portion whose projected shape in an axial direction is at least partially constituted by a circular arc or a curve similar to a circular arc, and wherein the cover is formed with a flat surface portion on a part of the side surface of the pseudo-circular-cylindrical portion, and wherein at least one of the flexible locking portions is provided in the flat surface portion of the pseudo-circular-cylindrical portion, wherein the cover has a rectangular cylindrical portion which includes sides including two extension surface portions and one opening surface portion, the extension surface portions being parallel to each other and being flat surfaces connected to side surfaces of the pseudo-circular-cylindrical portion, and the opening surface portion being a flat surface orthogonal to the extension surface portions, and wherein the flexible locking portions are formed on the extension surface portions of the rectangular cylindrical portion in addition to the flat surface portion of the pseudo-circular-cylindrical portion, wherein the pseudo-circular-cylindrical portion and the rectangular cylindrical portion are provided symmetrically with respect to a reference flat surface including a rotation axis of the motor, and wherein the plurality of flexible locking portions are arranged symmetrically with respect to the reference flat surface, wherein the cover is integrally formed of resin, wherein the flexible locking portions extend in a direction opposite to a top surface portion of the cover, beyond an opening end of the cover, from a portion near the opening end, and wherein the flexible locking portions have substantially U-shaped frame plate shapes, wherein the flat surface portion is formed to occupy an angular range from about 30 degrees to about 60 degrees about the rotation axis of the motor with respect to the reference flat surface.

2. The drive device according to claim 1, wherein the flat surface portion of the pseudo-circular-cylindrical portion is formed on an inside of a virtual curved surface formed by extending curved surface portions adjacent on both sides of the flat surface portion.

3. The drive device according to claim 2, wherein the circuit board has an outer edge which is shaped along an inner wall of the cover, and wherein the circuit board has a corresponding flat surface portion, in which the outer edge is formed with a straight line, on a position facing an inner wall of the flat surface portion of the pseudo-circular-cylindrical portion.

* * * * *